July 30, 1935.  A. R. THOMPSON  2,009,567
FRUIT PITTING MACHINE WITH VIBRATORY PITTING MEANS
Filed Jan. 28, 1933  2 Sheets-Sheet 1

Inventor
Albert R. Thompson
By Lyon & Lyon
Attorneys

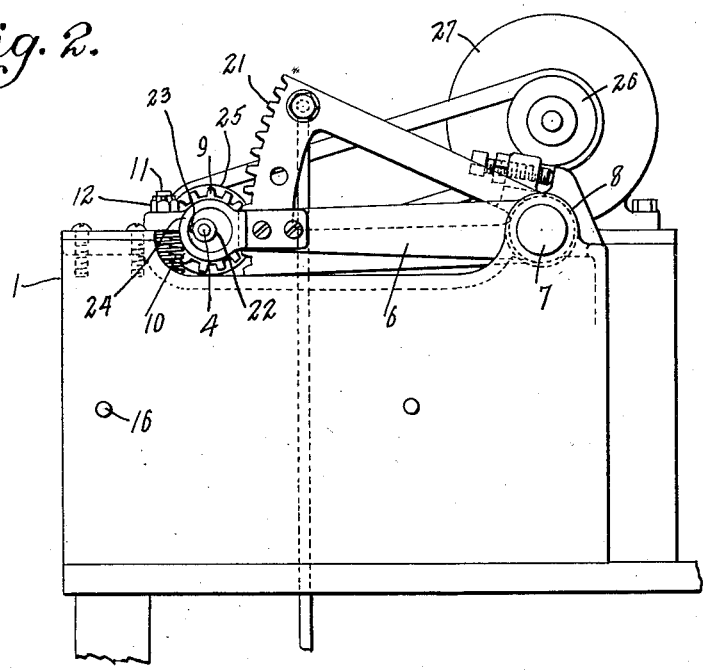
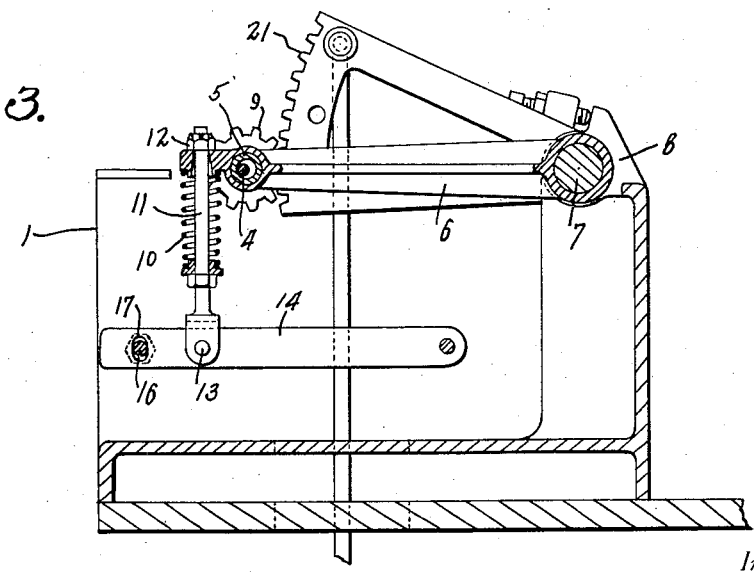

Patented July 30, 1935

2,009,567

UNITED STATES PATENT OFFICE 2,009,567

FRUIT PITTING MACHINE WITH VIBRATORY PITTING MEANS

Albert R. Thompson, San Jose, Calif., assignor to Pacific Machinery Company, San Francisco, Calif., a corporation of California Application January 28, 1933, Serial No. 654,002

5 Claims. (Cl. 146—28)

This invention relates to fruit pitting machines or devices in which there is incorporated vibratory pitting means and in which there is likewise provided means for determining the depth of cut of the pitting means utilized for removing the pit from the flesh of the fruit.

In the pitting of fruit, particularly cling-stone peaches, many peaches are found to have split pits so that when the flesh of the fruit is halved, the fruit falls into two portions without severing the pit.

In cases where the peaches run a high percentage of split pits, it has been found advisable to split all the peaches in halves and to remove the pit through the use of a split pit pitter. Such split pit pitters have also been advantageously used in other cases.

In the severing of pits from fruit it has been known heretofore as, for example, is disclosed in the Dunkley Patent No. 1,370,097, that if an oscillatory or vibratory motion is imparted to the pitting knife that the severing of the pit from the flesh of the fruit will be more effectively accomplished.

In my co-pending application, Serial No. 103,760, I have disclosed a form of split pit pitter in which the operation of removing the pit is performed by the holding of the pit in position with relation to an orificed plate carrying a pitting knife so that the pitting knife passes downwardly into the flesh of the fruit around the pit, and in which structure the aligning of the pit of the fruit with the pitting knife is accomplished by the fact that the operator of the machine may observe through the orifice of the contacting plate the position of the pit of the fruit with relation to the pitting knife.

This invention is addressed to an improved form of split pit pitter in which means are provided for imparting an oscillatory or vibratory motion to the pitting blade so as to enable the pitting blade to pass more freely and uniformly around the pit in severing the pit from the flesh of the fruit.

Another object of my invention is to provide in a fruit pitter means whereby the pitting knife may, as it is oscillated, yield when it contacts the pit of the fruit so as to determine the cut made through the flesh of the fruit to enable the knife to pass freely around the pit of the fruit without hanging up to break the pitting knife.

Another object of my invention is to provide a fruit pitting device for removing pits from halves of peaches or the like in which means are provided for determining the depths to which the pitting member will cut in the flesh of the fruit in passing around the pit thereof.

Another object of my invention is to provide a pitting device in which there is provided a pitting member supported at one end only and to which pitting knife means are adapted for imparting an oscillatory or vibratory motion to the pitting knife as the pitting knife is rotated to pass around the pit in the severing of the pit from the flesh of the fruit.

Other objects and advantages of this invention it is believed will be apparent from the following detailed description of a preferred embodiment thereof as illustrated in the accompanying drawings.

In the drawings:

Figure 2 is a side elevation thereof.

Figure 3 is a sectional side elevation taken substantially on the line 3—3 of Figure 1.

Figure 1:
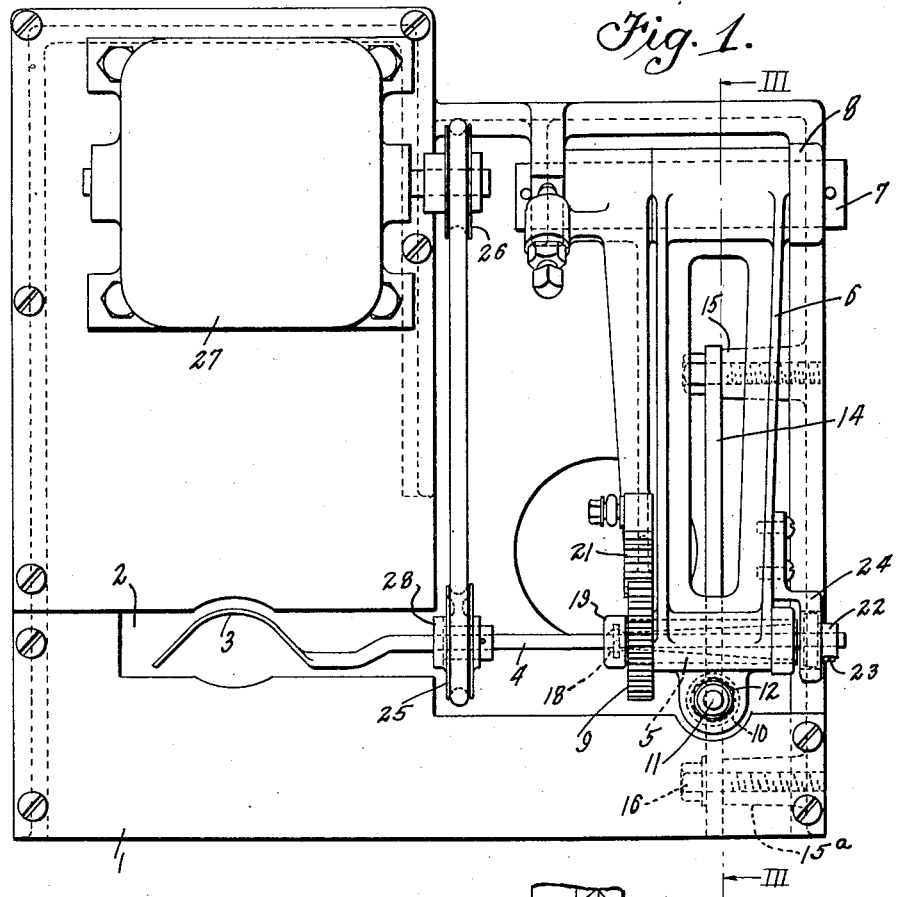
Figure 1 is a top plan view of the fruit pitting machine or device embodying my invention.
Figure 4:
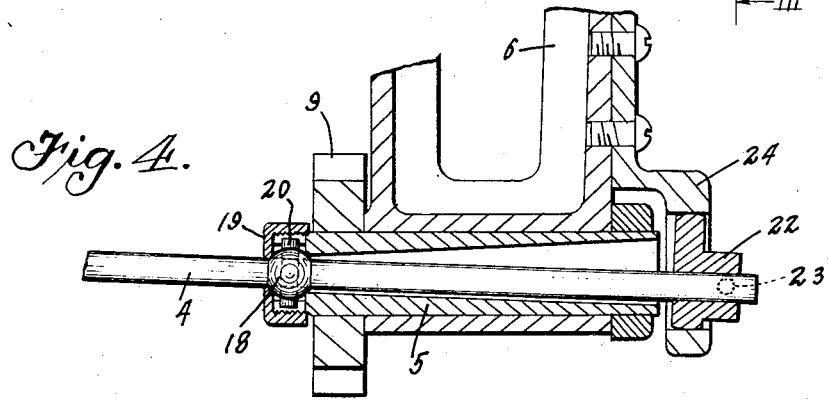
Figure 4 is a fragmental sectional view illustrating the means for mounting the oscillatory pitting knife embodying my invention.

In the preferred embodiment of my invention as illustrated in the accompanying drawings 1 indicates a table or plate having a pitting opening 2 therein. The table 1 is preferably mounted in horizontal position so that the previously halved fruit such as peaches, may be held on the under side of the table 1 permitting the operator to view the position of the pit of the peach or other fruit throughout the opening 2 and its position relative to the curved pitting knife 3.

The curved pitting knife 3 is preferably supported at one end and has its shank 4 supported in a sleeve 5 carrying an arm 6 pivotally mounted on a supporting pivot 7 mounted in a bracket 8 extended upwardly from the table or base 1.

In order to yieldably support the arms 6 and hence the pitting knife 3 so that if the knife 3 snags on the pit of the fruit so that pressure is brought to bear upon the driving pinion 9 provided for rotating the knife 3, the arm 6 will yield downwardly causing the curving knife 3 to lower with relation to the plate 1 permitting the knife to pass around the pit of the fruit and to produce a deeper cut in the fruit.

In order to thus yieldably and adjustably support the pitting knife 3 with relation to the opening 2 of the table 1 the forward end of the arm 6 is mounted upon a spring 10 mounted on a pin 11 which passes through the free end of the arm 6 and is held in position by means of a nut 12 threaded to the end of the rod 11.

In order to adjust the position of the arm 6 and hence the depth of the cut made by the knife 3 from the normal conditions, the opposite end of the rod 11 is pivotally secured by means of a pivot pin 13 to an adjustment arm 14. The adjustment arm 14 is at one end pivotally secured to a standard 15 which extends upwardly from the base 1. The opposite end of the adjustment arm 14 is secured in position by means of a cap screw 16 which is passed through a slot 17 and is threaded to a standard 15ᵃ mounted on the base 1. Thus by adjusting the position of the slot 17 with relation to the cap screw 16, the position of the normal operation of the knife 3 may be determined to determine the depth of cut made normally by the knife 3.

In order to give to the pitting knife 3 the oscillatory motion so as to aid the pitting knife 3 in making a clean cut around the pit of the fruit and to aid the knife in avoiding obstructions of the pit such as the fins thereof, I prefer to employ the following vibratory means and means for mounting the shank of the knife.

Formed on the shank of the knife is a ball 18 which fits within the end of the sleeve 5 and is held in position by means of a cap 19 permitting rotation of the knife 3 around the ball as a center with relation to the sleeve 5. A driving pin 20 is passed through the ball 9 and held within an enlarged slot formed in the end of the sleeve so that when the sleeve is driven or rotated the shoulders of the slot engage the pin 20 to rotate the knife.

Secured to the sleeve 5 is a driving pinion 9 which meshes with a stationary rack 21 so that when the rack 21 is rotated by any suitable or desirable means, the knife 3 is rotated to pass around the pit of the fruit. The outer end of the shank 4 of the knife is mounted in an eccentric bearing 22 which eccentric bearing member is secured to the outer end of the shaft by means of a set screw 23. The eccentric bearing is journaled within a bearing housing 24 so that by rotation of the eccentric bearing member 22, the degree of misalignment of the knife 3 in the bearing sleeve 5 may be regulated to produce a larger or smaller cut in the fruit without changing the size of the knife 3.

Mounted upon the shank 4 of the knife 3 is an overbalanced pulley 25, which overbalanced pulley 25 is driven by means of a belt from a pulley 26 of an electric motor 27 which rotates the pulley at relatively high speed so that the rotation of the overbalanced pulley produces an oscillation or vibration of the knife 3 as it is rotated. Pulley 25 is journaled upon a bearing 28 which is secured to the shank 4.

The rack 21 which meshes with the pinion 9 to rotate the shank 4 of the knife 3 is pivotally mounted upon the pivot 7 and there is secured to the rack an arm which extends under the table 1 and is connected with a foot pedal not shown. Thus when the foot pedal is depressed, the rack 21 is pulled downwardly to cause the pinion 9 and hence the shank 4 of the knife 3 to revolve around the pit. Any suitable or desirable form of spring means may be applied to the rack 21 for returning the knife to its normal position which is normally within the opening 2 of the table 1.

Having fully described my invention, it is to be understood that I do not wish to be limited to the details herein set forth, but my invention is of the full scope of the appended claims.

I claim:

1. In a fruit pitting device, the combination of a knife having a shank, means for rotatably supporting the shank, means for rotating the shank of the knife to rotate the knife, overbalance weighted means mounted on the shaft to rotate relative thereto, and means for rotating said overbalanced weighted means at a relatively high rate of revolution to impart a vibratory motion to the knife.

2. In a fruit pitting device, the combination of a knife having a shank, means for rotatably supporting the shank of the knife between its ends, adjustable means spaced from the supporting means for adjusting the position of the shank of the knife to determine the position of the knife, means operatively connected with the shank of the knife for rotating the shank of the knife to rotate the knife in its adjusted positions, and means mounted upon the shank of the knife and rotatable relative thereto for imparting a vibratory motion to the knife as the knife is rotated.

3. In a fruit pitting device, the combination of a knife having a shank, means for rotatably supporting the shank between its ends so as to permit an adjustment of the position of the knife around said supporting means, and an eccentric operatively connected with the shank for supporting the shank in a position spaced from the first supporting means and adjustable to move the shank with reference to the first supporting means to adjust the position of the knife.

4. In a fruit pitting device, the combination of a knife having a shank, a sleeve, means operatively connecting the shank and sleeve permitting of a transverse adjustment of the knife shank within the sleeve to adjust the position of the knife, and means operatively connected to the shank for adjusting the position of the shank within the sleeve upon the connecting means between the shank and the sleeve.

5. In a fruit pitting device, the combination of a knife having a shank, a pitting plate, pitting means providing an opening through which the knife is adapted to operate to remove the pit from a fruit, means mounted upon the shank and rotatable relative thereto for imparting a vibratory motion to the knife, means mounted on the shank and operable for rotating the knife to cause the same to pass into the said opening to cut the pit from a fruit, and means for supporting the pitting knife including a relatively fixed supporting means and an adjustable supporting means adjustable to adjust the position of the shank of the knife to vary the position of the knife with reference to the said opening.

ALBERT R. THOMPSON.